SWITCH INDICATOR DEVICE FOR PRINTED CIRCUIT
Filed Nov. 25, 1964 2 Sheets-Sheet 1
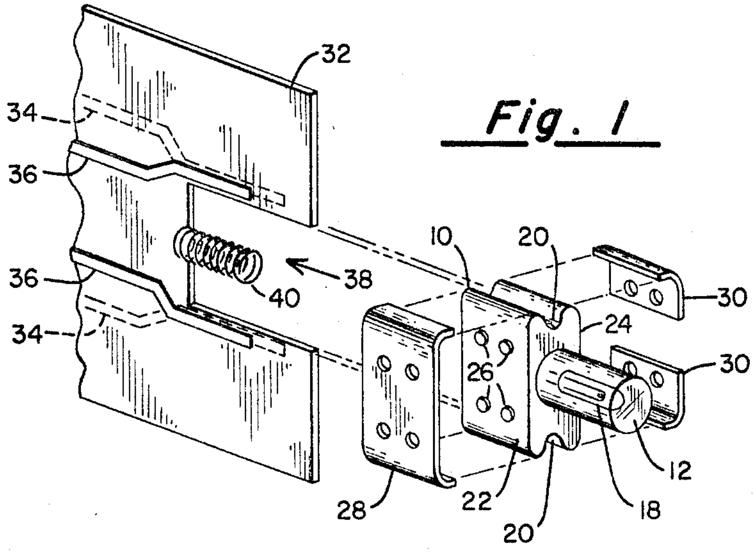
Fig. 1
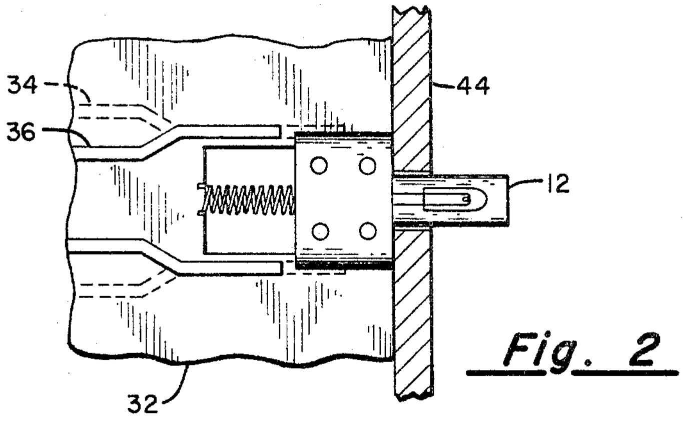
Fig. 2
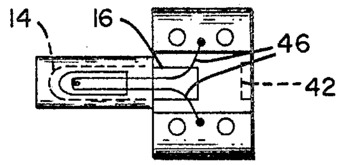
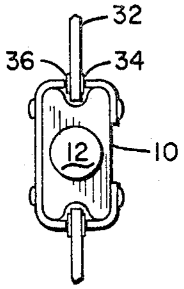
Fig. 3 Fig. 4
INVENTOR.
HAROLD G. O'BRIEN
BY
Joseph A. Spelduick
AGENT INVENTOR
HAROLD G. O'BRIEN
BY
Joseph A. Speldrich
AGENT United States Patent Office 3,272,951
Patented Sept. 13, 1966

3,272,951
SWITCH INDICATOR DEVICE FOR PRINTED CIRCUIT

Harold G. O'Brien, Minneapolis, Minn., assignor to Sperry Rand Corporation, New York, N.Y., a corporation of Delaware Filed Nov. 25, 1964, Ser. No. 413,724
14 Claims. (Cl. 200—167)

This invention relates generally to switch-indicator assemblies for the purpose of providing a push button switching and indicating apparatus arranged with a printed circuit board attached to a control panel to form a removable module.

In the present stage of switch and indicator technology, various structural configurations have been utilized to provide the desired switching and indicating functions; however, none include the concept of logic switching, indication, and modular design through the use of a printed circuit member operatively receiving the switch-indicator in a sliding relationship. Disadvantages of prior art devices are due in part to the large spatial requirements needed to mount the switch-indicators on a panel. The number of such units is limited, unless the control panel is enlarged, which again emphasizes the practical space requirements problem. Prior art devices of the immediate nature also necessitated wiring techniques that were cumbersome, critical, and susceptible to breakage as well as being highly expensive in nature. In light of rapid developments in the computer and related fields, necessity for miniaturization reliability, and economy, there has arisen the necessity of developing switch-indicators which are simple, rugged, reliable, compact, inexpensive, and readily detachable with a control panel in the form of a module.

Accordingly, the present invention meets those requirements by the development of a push button type switch-indicator which permits machine wiring of the switch-indicator connections and eliminates expensive central maintenance panels. The invention advantageously locates maintenance logic control at or near the controlled logic. The invention is characterized by depressible actuator assemblies operatively connected with printed circuit boards. More specifically, in a preferred manner the actuators of a column are mounted in a notched printed circuit board wherein the actuator assemblies are selectively depressible into and out of the respective notches of the printed circuit board through the use of biasing means. The printed circuit board is secured to a front panel portion containing holes therein to receive the actuator push buttons. The combination of the printed circuit board, the actuator assemblies, and the panel portion comprise a modular unit permitting removal and insertion of the assembly from a connector having terminals that are wire wrapped.

It is an object of the present invention to provide a switch-indicator for use with a printed circuit board.

It is another object of the present invention to provide a switch-indicator assembly selectively depressible to make electrical contact with printed circuit board conductors.

It is an additional object of the present invention to provide a switch-indicator module which is reliable, compact, and low cost.

It is yet another object of the present invention to provide a logic switching module which is located at or near the controlled logic.

It is still another object of this invention to provide a multiple logic switching device.

It is a further object of the present invention to provide a switch-indicator mounted on a printed circuit board permitting machine wire wrapping of the switch-indicator connections.

It is yet a further object of the present invention to provide logic switching and indicating means mounted to and behind a control panel which apparatus and control panel is inserted as a module into a connector which is machine wired with respect to the controlled logic.

These and other more detailed and specific objects will be disclosed in the course of the following specification, reference being had to the accompanying drawing in which:

FIGURE 1 is a disassembled view of a switch-indicator assembly and a printed circuit board shown without a control panel.

FIGURE 2 is a side view in partial of a switch-indicator assembly attached to a control panel and assembled with the printed circuit board.

FIGURE 3 is a side view of the switch-actuator assembly.

FIGURE 4 is an end view of the assembly together with a printed circuit board.

Figure 5:
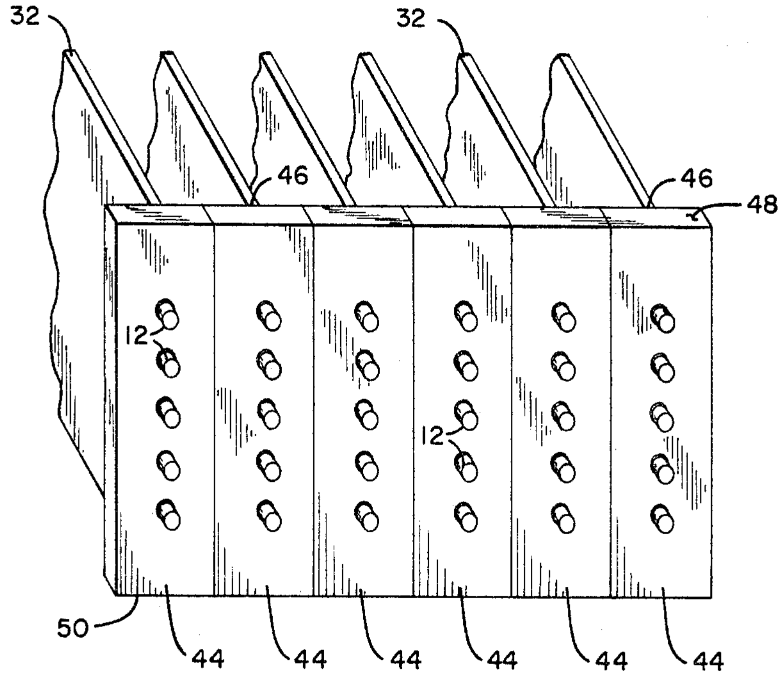
FIGURE 5 is an isometric view of several control panels together shown with the respective circuit boards.

Referring to FIGURE 1, the actuator assembly includes an insulating block or mounting block 10 having a push button 12 integral therewith. The insulating block and pushbutton may be formed by a conventional technique well known in the art. The pushbutton 12 contains therein a cavity 14 which cavity communicates with a cavity portion 16 in the insulating block 10. An indicator lamp 18 is mounted within the cavity 14. The top and bottom portions of the block 10 contain recesses, slots, or guide grooves 20 which are used as described below. Sides 22 and 24 of the block have integrally formed therewith projects 26 for mounting, respectively, the switch shorting bar 28 and indicator electrodes 30. It is to be understood that the structural configuration of the constituents of the actuator assembly illustrated is not to be limited to that shown but may vary in accordance with the objects of the invention. To secure the switch shorting bar 28 and the indicator electrodes 30 to the insulator block 10, the projects are heated. It is evident, however, that any suitable means of securing may be utilized such as screws for example.

The slots or guides 20 of the insulator block cooperate with a printed circuit board 32 containing for example conductor pairs 34 and 36. As seen from FIGURE 2, in the assembled view, the actuator assembly is positioned within a notch 38 of the printed circuit board 32. A biasing means such as spring 40 cooperates with a recess 42 in the rear of block 10 to maintain the actuator assembly in a position away from the closed end of the notch 38.

As observed from the figures there are shown two pairs of conductors, the printed circuit conductors 34 projecting beyond the conductors 36. When mounted on the printed circuit board, the indicator electrodes 30 are always in contact with conductors 34, shown in dashed lines. Upon depression of the actuator assembly, the switch shorting bar comes into contact with the conductors 36. Upon release, the spring 40 returns the assembly to its normal position against the maintenance or control panel 44. In the released position, only conductors 34 remain in closed circuit through the indicator electrodes 30 and the lamp filament. Referring to FIG. 5, there is shown the modular configuration of the preferred form of the invention. The edge 46 of the printed circuit boards 32 are secured to the back of the control panel portions 44 by cementing or are secured to the panel portions by other suitable means. A plurality of printed circuit boards 32 may thus be secured in such manner to the control panel portions 44. For example, eight printed circuit boards, each having nine switch-indicators may be utilized with the configuration. The nine switch-indicators and eight printed circuit boards would provide 9×2×8 (144) logic connections. However, no intention is made to limit the number of printed circuit boards and switch actuator assemblies. Top and bottom portions of the panel portions, 48 and 50, respectively, would be utilized to remove the panel portion 44 or module which includes the panel portion, printed circuit board, and switch actuator assemblies in each column. By considering each column as a module, the required forces to insert the module into the connector block is substantially reduced as opposed to considering all of the panel portions 44 together as one large module. As is evident from FIG. 5, each printed circuit board would contain a plurality of conductor pairs 34 and 36, each electrically connected to their respective logic devices by way of the connector into which the printed circuit board is inserted. It is to be understood that the present invention is not to be limited to a modular configuration consisting of one printed circuit board secured to a columnar panel portion 44 mounting a plurality of actuator assemblies. Each switch actuator could have its own printed circuit board and panel element, although as evident, each of the plurality of printed circuit boards in each column would be a fraction of the size of a single board as used in the preferred embodiment of FIGURE 5. Each small printed circuit board would, accordingly, be seucured to its respective panel element as aforementioned. Accordingly, each individual actuator assembly, printed circuit board, and panel element can be removed as needed from the connector as a module. It is evident that the configuration would still permit the control panels of a column to be removed and inserted as a columnar module.

As another alternative, on a larger scale, the printed circuit boards and the switch actuator assemblers are mounted behind a control or maintenance panel. A plurality of printed circuit boards would preferably be secured to the panel member. To provide a maintenance check, for example, the operator removes the whole module as a unit whereby the printed circuit board conductors are electrically and mechanically disengaged from a connector, this arrangement similarly eliminating rewiring of the logic circuit interconnections upon re-engagement, at the same time locating the maintenance or other logic control close to the logic being controlled as in the above mentioned alternatives. After completing the maintenance check, the operator merely inserts the modular unit into the connector block once again to re-establish circuit connections.

A distinctive advantage of the present invention lies in its capability of providing switching functions as well as that of being an indicator device. More specifically, depression of an actuator assembly causes a closed circuit through the conductors 36 through the shorting bar 28 to provide a logic switching function of logic devices, such as flip-flops, for example, used herewith. It is within the scope of the present invention, not shown, to provide multiple switching functions using only a single actuator or assembly or relatively fewer than nine per column by stacking a plurality of successively longer shorting bars against each other with insulation therebetween. Accordingly, the corresponding printed circuit board would contain a plurality of conductor pairs 34 and 36. Upon depression of the actuator assembly, each shorting bar would make contact with respective pairs of conductors to permit multiple switching operations of the logic devices used in the application, thus eliminating many actuator assemblies. As an alternative, each of the conductor pairs on a printed circuit board could be branched to respective logic devices whereby depression, for example, a single actuator assembly could initiate multiple switching operations of a plurality of logic devices. As another alternative, a plurality of actuator assemblies having a common lamp, may be ganged to each other such that depression of the actuator assembly unit produces multiple logic switching operations and a single indicator thereof.

The lamp circuitry includes the filament leads 46 which are secured in a suitable manner as the indicator electrodes 30.

*Operation*

Since the lamp and indicator electrodes are constantly maintained in a closed circuit relationship with respect to the logic devices being used herewith, depression of the actuator assembly causing the switch shorting bar to make contact with the shorter conductor pair also extending from the logic device, causes the lamp filament to be energized upon a switching function being executed. For example, it may be desired to provide a switching function to a logic flip-flop element. Upon depression of the switch actuator assembly, the shorter conductors on the printed circuit board make contact with the shorting bar to set the flip-flop to the "1" state. Simultaneously with the set of the flip-flop the lamp filament is energized. Upon release of the actuator assembly, the lamp filament remains energized to indicate that the flip-flop is in the set or "1" state. To deenergize the lamp, a clear button would be utilized which would simultaneously reset the flip-flop to its "0" state.

As mentioned above, multiple switching functions utilizing multiple actuator assemblies as a unit or a plurality of shorting bars or a branched printed circuit technique would provide the same functions on a larger scale.

To provide a maintenance check, the operator removes in the preferred embodiment the columnar module. Accordingly the printed circuit board conductors are removed from their associated connectors. After inspection, the module is reinserted such that the printed circuit conductors are reengaged within the connector. The same principle or removal and insertion operation exists with the other modulator concepts aforementioned.

It is understood that suitable modifications may be made in the structure as disclosed provided that such modifications come within the spirit and scope of the appended claims. Having now, therefore, fully illustrated and described my invention, what I claim to be new and desire to protect by Letters Patent is:

1. A switch-indicator assembly comprising in combination:

(a) an actuator assembly consisting of an insulation block mounting an indicator light means;
(b) a switch shorting bar means mounted on one side of said actuator assembly;
(c) indicator electrode means mounted on an opposite side of said actuator assembly;
(d) a printed circuit board containing printed circuit means and containing a notch adapted to receive said actuator assembly in a sliding manner;
(e) a panel member having secured to one face thereof an edge of said printed circuit board;
(f) and a biasing means secured to one end of said notch for urging said actuator assembly in a direction toward said panel face whereby the application of a force in opposition to the bias effects an electrical function through a circuit including the printed circuit means.

2. The invention defined in claim 1 wherein said insulation block is substantially rectangular and contains on two sides a guide means cooperating with the printed circuit board permitting the actuator assembly to move inward and outward of the printed circuit board.

3. The invention defined in claim 2 wherein said printed circuit board contains at least two pairs of conductors, with a pair being disposed on opposite sides of the board, one pair of said conductors being shorter in length than the other of said pairs whereby depression of the actuator assembly causes the shorting bar to make electrical contact with the shorter conductor pair to provide a logic switching function of the logic devices operatively associated with said conductors.

4. The invention defined in claim 3 wherein said actuator assembly is maintained in said printed circuit board notch by the panel member such that said longer conductors are continuously in contact with the indicator electrodes and upon depression of said actuator assembly further into said notch said shorter conductors make electrical contact with said switch shorting bar means.

5. The invention defined in claim 2 wherein there are further included a plurality of switch actuators operatively disposed with respective notches in the printed circuit board, said printed circuit board being secured to the panel member, to form a columnar module.

6. The invention defined in claim 5 wherein said actuator assemblies are positioned behind the panel member such that the actuating buttons project beyond the panel member through holes therein.

7. A switch-indicator assembly for use with logic circuitry comprising in combination: an actuator assembly consisting of an insulating mounting member substantially rectangular in cross-section and containing on two sides thereof guide grooves cooperating with a printed circuit member; a push button containing a cavity portion cooperating with a cavity portion within the insulating block, said push button being integral with the insulating member; projects extending from two lateral sides of the insulating mounting member; a switch shorting means disposed on one lateral side of the insulating block; and indicator electrode means disposed on the other lateral side of the insulating mounting member, said shorting means and electrode means secured to said insulating block by the projects; lamp filament means disposed within the push button cavity having electrical leads extending through the cavity portion within the insulating block and secured to the electrode means; said printed circuit member containing on one end thereof a notch means cooperating with the actuator assembly, biasing means secured within the notch and cooperating with a recess in the insulating mounting member to maintain said actuator assembly outwardly from said notch, said printed circuit member containing thereon at least two pairs of conductive elements, with one pair being shorter in length than the other conductive elements of the other pair disposed on an opposite side of the printed circuit member, whereby depression of said actuator assembly causes said printed circuit member to cooperate with said grooves and receive the actuator assembly wherein said shorter pair of conductive elements make electrical contact with the shorting means to produce a logic switching function of a device used herewith and to simultaneously cause energization of the lamp filament means and whereby release of the actuator assembly discontinues electrical contact with the shorter conductive elements and the lamp filament means is deenergized to indicate that a switching function has been effected to the logic device cooperating with said conductive elements.

8. The invention defined in claim 7 wherein said longer pair of conductive elements remain in electrical contact with soid electrode means and lamp filament means in the undepressed position of the actuator assembly.

9. The invention defined in claim 8 wherein said actuator assembly is mounted behind a control panel portion containing a hole therein for receiving the push button which projects therethrough.

10. The invention defined in claim 8 further including a plurality of adjacent printed circuit members secured to panel members, respectively, each of said printed circuit members containing a plurality of notches and conductors to accommodate a corresponding plurality of switch actuator assemblies, the combination of single printed circuit member, the corresponding actuator assemblies and the single panel member constituting a columnar module.

11. The invention defined in claim 10 wherein a plurality of columnar modules are disposed in panel fashion to constitute a control panel face.

12. The invention defined in claim 7 further including a plurality of actuator assemblies and a plurality of printed circuit boards for a plurality of columns respectively secured to a plurality of control panels to form individual modular units for each column.

13. A switch-indicator module combination comprising: switch actuator assemblies including indicator means; a printed circuit means; a panel member; said indicator means being operatively disposed between said printed circuit means and said panel member, the panel member containing holes therein for receiving an extension of said actuator assemblies, said printed circuit means electrically cooperating with a connector means for insertion therein, said printed circuit means, actuator assemblies, and panel member forming a module which is removable from said connector means.

14. A switch-indicator assembly comprising in combination:

(a) an actuator assembly, said actuator assembly mounting conductive means on both sides thereof;
(b) indicator means mounted on the actuator assembly and electrically connected to the conductive means on one side of the actuator assembly;
(c) a printed circuit board mounting conductive members, and a recess in the printed circuit board adapted to receive said actuator assembly;
(d) guiding means on said actuator assembly cooperating with said printed circuit board recess to permit depression of the actuator assembly into the recess whereby electrical continuity between the conductive means on the actuator assembly and the conductive members on the printed circuit board is effective to cause an indication on the indicator means;
(e) and biasing means secured in said recess effective to bias said actuator assembly in an outwardly direction of said recess for electrically disconnecting some of said conductive members from some of said conductive means.

References Cited by the Examiner

UNITED STATES PATENTS

| | | | |
|---|---|---|---|
| 3,140,377 | 7/1964 | Koci et al. ---------- | 200—167 |
| 3,170,056 | 2/1965 | Keene ------------- | 200—166 |

ROBERT K. SCHAEFER, *Primary Examiner.*

KATHLEEN H. CLAFFY, *Examiner.*

H. O. JONES, *Assistant Examiner.*